United States Patent
Wach

(10) Patent No.: US 9,083,457 B1
(45) Date of Patent: *Jul. 14, 2015

(54) METHOD AND SYSTEM FOR EVALUATING AN OPTICAL DEVICE

(75) Inventor: Michael L. Wach, Alpharetta, GA (US)

(73) Assignee: CIRREX SYSTEMS, LLC, Wilmington, DE (US)

( * ) Notice: Subject to any disclaimer, the term of this patent is extended or adjusted under 35 U.S.C. 154(b) by 572 days.

This patent is subject to a terminal disclaimer.

(21) Appl. No.: 13/371,397

(22) Filed: Feb. 11, 2012

Related U.S. Application Data

(63) Continuation of application No. 12/011,562, filed on Jan. 28, 2008, now Pat. No. 8,116,624.

(60) Provisional application No. 60/898,163, filed on Jan. 29, 2007.

(51) Int. Cl.
*H04B 10/07* (2013.01)
*H04B 10/073* (2013.01)
*H04B 10/079* (2013.01)

(52) U.S. Cl.
CPC .......... *H04B 10/073* (2013.01); *H04B 10/0795* (2013.01)

(58) Field of Classification Search
CPC ............................ G01M 11/35; H04B 10/0795
USPC ........................................................ 398/28
See application file for complete search history.

(56) References Cited

U.S. PATENT DOCUMENTS

| | | | |
|---|---|---|---|
| 4,820,016 A * | 4/1989 | Cohen et al. | 385/5 |
| 6,819,807 B2 * | 11/2004 | Garner et al. | 385/1 |
| 7,113,659 B2 | 9/2006 | Taverner | |
| 7,233,739 B2 * | 6/2007 | Patel et al. | 398/25 |
| 7,532,656 B2 | 5/2009 | Yang et al. | |
| 2004/0091227 A1 | 5/2004 | Wang et al. | |
| 2005/0025498 A1 | 2/2005 | Ono et al. | |
| 2006/0008227 A1 * | 1/2006 | Schmidt et al. | 385/129 |
| 2008/0140368 A1 | 6/2008 | Gilbert et al. | |
| 2011/0097045 A1 | 4/2011 | Benabid | |

OTHER PUBLICATIONS

Rong et al., "A Continuous-wave Raman Silicon Laser," Feb. 17, 2005, *Nature*, vol. 433, pp. 725-728.

Rong et al., "An All-Silicon Raman Laser," Jan. 20, 2005, *Nature*, vol. 433, pp. 292-294.

(Continued)

*Primary Examiner* — Shi K Li
(74) *Attorney, Agent, or Firm* — Ascenda Law Group, PC

(57) ABSTRACT

Light escaping from an optical path, for example via Raman or Rayleigh scattering, can provide information about how light flows in the path, about the optical path, or about matter disposed in the optical path. The path can be a waveguide, an optical channel, or a fiber that may be attached to or integrated with a substrate, for example in a passive or active planar lightguide/lightwave circuit, photonic integrated circuit, semiconductor laser, or optoelectronic element. The escaped light can be color-shifted with respect to the primary light flowing along the path. The escaped light can leave the path at an angle that facilitates detection. Processing or analyzing the scattered light, for example with support of a computing device, can help evaluate the path and/or assess a light intensity pattern thereof, for example to aid design, engineering, testing, qualification, troubleshooting, inspection, manufacturing, etc.

20 Claims, 3 Drawing Sheets

(56) References Cited

OTHER PUBLICATIONS

Faist, Jerome, "Silicon Shines on," Feb. 17, 2005, *Nature*, vol. 433, pp. 691-692.
Koehl et al., "Continuous Silicon Laser, Intel Researchers Create the First Continuous Silicon Laser Based on the Raman Effect Using Standard CMOS Technology," 2005, White Paper, www.Intel.com, 6 pp.
Paniccia et al., "Intel's Research in Silicon Photonics Could Bring High-Speed Optical Communications to Silicon," Feb. 2004, White Paper, www.Intel.com, 6 pp.
Salib et al., "Silicon Photonics," May 10, 2004, *Intel Technology Journal*, vol. 8, Issue 2, pp. 143-160.
Paniccia et al., "Introducing Intel's Advances in Silicon Photonics," Feb. 2004, White Paper, accessed at http://www.intel.com/content/dam/www/public/us/en/documents/intel-research/intel_Advances_Silicon_Photonics.pdf, 5 pp.
Paniccia et al., "Intel Unveils Silicon Photonics Breakthrough: High-Speed Silicon Modulation," Feb./Mar. 2004, Technology@Intel_Magazine, accessed at http://www.onversity.net/load/optic_modu.pdf, 6pp.
U.S. Notice of Allowance dated Oct. 13, 2011 in U.S. Appl. No. 12/011,562.
U.S. Official Action dated Aug. 24, 2011 in U.S. Appl. No. 12/011,562.
U.S. Official Action dated Dec. 14, 2010 in U.S. Appl. No. 12/011,562.
Y. Okamura et al., "Simple method of measuring propagation properties of integrated optical waveguides: An improvement," Jan. 1985, *Applied Optics*, vol. 24, No. 1.
Y. Okamura et al., "Measuring mode propagation losses of integrated optical waveguides: A simple method," Dec. 1983, *Applied Optics*, vol. 22, No. 23.
Kartalopoulos, "Introduction to DWDM technology," 2000, IEEE Press, pp. 28-31 and 60-62.
Kartalopoulos, "Introduction to DWDM technology," 2000, IEEE Press, pp. 12-13.

\* cited by examiner

METHOD AND SYSTEM FOR EVALUATING AN OPTICAL DEVICE

CROSS REFERENCE TO RELATED APPLICATIONS

This application is a continuation of U.S. patent application Ser. No. 12/011,562, filed on Jan. 28, 2008 in the name of Wach, entitled "Method and System for Evaluating an Optical Device" (issue date of Feb. 14, 2012 as U.S. Pat. No. 8,116,624), which claims priority to U.S. Provisional Patent Application No. 60/898,163 filed Jan. 29, 2007 in the name of Wach and entitled "Method and System for Evaluating an Optical Device." The entire contents of U.S. Provisional Patent Application No. 60/898,163 and U.S. patent application Ser. No. 12/011,562 are hereby incorporated herein by reference.

TECHNICAL FIELD

The present technology relates to testing an optical device, such as a photonic integrated circuit or an "optical chip" comprising a planar substrate. More specifically, the present technology relates to transmitting light along a waveguide or an optical path and analyzing light scattered out of the path, wherein the analysis yields a characteristic, such as a light intensity profile, an operational parameter, or chemical information about matter disposed in the path.

BACKGROUND

Optical technologies play an increasingly prominent role in numerous applications, such as in medicine, research, communications, displays, media devices, computing systems, etc. An ongoing trend to miniaturize and integrate optical systems parallels the miniaturization and integration that has occurred in electronics. Electrical devices transitioned from a platform of vacuum tubes, to discrete transistors, and finally to chips in which transistor elements are integrated into a substrate of silicon or other suitable material. Likewise, integrated optical systems are being produced in/on substrates of silicon, glass, sapphire, silicon dioxide, indium phosphide ("InP"), or some other suitable material.

Such Integrated optical systems may comprise lasing dies, optical modulators, optical attenuators, optical amplifiers, optical waveguides, and/or other optical elements and features that are attached to, embedded in, or otherwise integrated with a substrate that typically has at least one planar surface. Integrated optical systems may further comprise electronic logic elements, transistors, and/or other electrical devices that coexist on or in the substrate with optical devices. Optical channels, optical paths, or waveguides typically conduct optical signals with the integrated optical system. The channels may be embedded within the substrate, may be covered by a coating, may span through free space, or may comprise an air gap, for example. Oftentimes, the optical channels lack good accessible for testing, evaluation, or design confirmation conducted with conventional technologies. With the channels situated in inaccessible locations, an engineer or an automated testing machine can not readily determine the optical properties of the channels using conventional technologies. One conventional approach to studying optical channels involves modeling the optical system in software; however, determining the modeling parameters and confirming that the model is accurate can also be difficult with conventional technologies.

To address these representative deficiencies in the art, what is needed is an improved capability for evaluating optical devices, for determining how light flows through optical devices, and for identifying physical and optical parameters of optical devices. A further need exists for characterizing optical channels that are prohibitively small, covered, embedded, or otherwise essentially inaccessible to physical insertion of a detector into the channels. Yet another need exists for extracting luminous energy from an optical channel to support determining something about the channel or about some device associated with the channel. Still another need exists for a technology that can perform nondestructive testing or evaluation of optical systems, including optical systems that may comprise (or that may consist of) expanded beam elements, lenses, waveguides, optical fibers, gratings, filters, thin films, semiconductor elements, laser chips or dies, and/or detectors, for example. A technology filling one or more of these needs would facilitate more robust optical designs, shorter engineering cycles, more efficient manufacturing, improved theoretical and practical understanding of optical systems, failure analysis, optimizing of fabrication processes and parameters, and/or cost effective post-production inspection, among other benefits.

SUMMARY

The present invention can support evaluating an optical behavior or a characteristic of an optical system, for example in connection with troubleshooting, manufacturing inspection, testing, qualification, modeling feedback, design, engineering, automated assembly, investigation, or some other activity.

The optical system can comprise a planar lightguide/lightwave circuit ("PLC"), a photonic integrated circuit ("PIC"), a monolithically integrated optical system, a hybrid integrated device, a system that comprises electrical chips and photonic elements, a semiconductor laser, an optoelectronic die or chip, a waveguide, an optical fiber, a photonic crystal, an optical bus of a multiprocessor computing system, an optical backplane, a vertical cavity surface emitting laser ("VCSEL"), a distributed feedback ("DFB") laser, a semiconductor optical amplifier ("SOA"), a silicon optical amplifier ("SiOA"), a silicon ("Si") photonic device, a silicon-based laser, a Raman laser, an erbium doped fiber amplifier ("EDFA"), an erbium doped waveguide amplifier ("EDWA"), a charge coupled device ("CCD"), a light emitting diode ("LED"), an avalanche photodiode ("APD"), an indium gallium arsenide ("InGaAs") detector, a lithium niobate ("LiNO$_3$") chip, a periodically poled system such as a periodically poled LiNO$_3$ ("PPLN") component, an InP device, a thin film, an interferometer, a ring resonator, an optical modulator, a germanium ("Ge") detector, a Mach-Zehnder laser modulator, an external cavity laser, an electro-absorption modulator ("EAM"), an expanded beam system, a gradient index ("grin") lens, a thin-film interference filter, a coating or layer of optical material, a diffraction grating, a Bragg grating, a micro-electromechanical system ("MEMS") that manages light, a resonant optical cavity, or an etalon, to name but a few possibilities. Either the entire optical system or some element there of (e.g. one mentioned above) can be the subject of investigation, the "device under test" ("DUT").

In one aspect of the present invention, light can transmit, flow, propagate, or otherwise move along an optical path of the system. The light flowing along the optical path can induce, cause, or undergo light scattering. That is, a portion of the luminous energy that is traveling along the optical path can diverge from, be deflected from, branch off from, deviate from, or turn aside from the optical path. An interaction can occur between matter of the light path and the light flowing therein, with the light-matter interaction causing some light to exit, leave, or escape from the light path. Thus, an effect (or a phenomenon) can cause a photon traveling along a heading or trajectory within the optical system to produce (or to transform, in whole or in part, into) a photon that travels along another heading or trajectory. Consequently, scattered light can exit the optical path, typically but not necessarily at a side of the optical path. Analyzing or processing this scattered or diverging light can determine, assess, or infer information about the optical system.

The determined information can comprise (without limitation) a characteristic of the light path, an assessment of integrity of the system, a pattern or profile of light flow along the optical path, a light pattern or light profile associated with a cross section of the optical path, an intensity profile, one or more refractive index values, an indication of whether a flaw or inclusion exists, information about a power condition, a state or condition of operation, a location of a microscopic or nano-scale fracture, whether a portion of the light path is non-homogeneous, a value of a parameter such as color or wavelength of the light that flows normally in the optical path, a concentration of dopant or additive, a location of a node or a peak of a standing wave of light, determination of a nonlinear behavior, an assessment regarding accuracy of a model of the optical system, operational information about an element of the optical system (such as one the representative components discussed above), polarization information, filtering information, data about a gain medium, an assessment of a lasing state, quality or packing density or granularity of a coating or a layer of optical material, an electrical parameter (including voltage or current) impacting light, a temperature, whether a leak exists in the light path, etc.

The optical path can comprise a multimode or single-mode/mono-mode waveguide, a near field, an optical channel, an active or a passive material, a gain medium, a light route, a waveguiding aperture, a hole, a totally internally reflective ("TIR") interface, a core circumscribed by a cladding, a structure comprising a refractive index profile that controls or steers or guides light, a gradient index structure, a holey fiber, a branch or leg of an optical circuit, one or more relay mirrors, a mode-confining material, an area where light flows in an unguided or expanded-beam state, or some feature that promotes or sustain light flow, for example. The optical path can be straight, linear, curved, bent, sinuous, helical, broken, unbroken, etc. In cross section, the path can be square, oval, round, circular, planar, slab-shaped, oblong, donut-shaped, bow-tie shaped, elliptical, etc., with such geometry describing either a physical structure or a pattern/ intensity profile of the light flowing therein. Accordingly, one of the elements discussed above can comprise or be disposed in the optical path, for example.

Operating the optical system can produce the light flowing along the optical path that induces the scattered light. That is, during normal system operation, some element of the optical system can output (or otherwise manage) the light flowing along the optical path. Alternatively, the light flowing along the optical path can be introduced into the optical path in connection with the evaluation. Accordingly, an entity such as a person, a testing apparatus, an instrument, or a machine can couple light into the optical path in order to conduct an evaluation of the optical path or of some other aspect of the optical system. The light flowing along the optical path can be digitally or analog modulated so that the flowing light carries or is encoded with information or data. Alternatively, that light can be un-modulated, without conveying encoded information.

Moreover, the light flowing along the optical path can be narrow band, broadband, white light, colored light, monochromatic, polychromatic, multi-color, single color, polarized, randomly polarized, coherent, etc. In terms of wavelength, the light flowing along the optical path can be ultraviolet ("UV"), vacuum UV ("VUV"), visible, near infrared ("NIR"), infrared ("IR"), mid-infrared, or some other wavelength, color, or frequency within or outside the range of human visible perception. For example, the light flowing along the optical path can have a wavelength in a range suitable for optical communication, such near 850 nanometers ("nm"), 1310 nm, or 1550 nm. The light can be luminous or photonic energy, electromagnetic ("EM") radiation, EM energy, photons, or light waves.

The effect or phenomenon that produced the scattered light can comprise (without limitation) a light-matter interaction, elastic scattering, inelastic scattering, Raman scattering, a Stokes-shift, an anti-Stokes-shift, resonant Raman, UV resonant Raman, spontaneous Raman, stimulated Raman, surface enhanced Raman scattering ("SERS"), Mie scattering, Rayleigh scattering, Brillouin scattering, a stimulated emission, lasing, fluorescence, an interaction between light and a molecular or a chemical bond, a transfer of energy to a vibration of a bond or an electron cloud, a light-electron cloud interaction, a single-photon effect, or a multi-photon effect, for example. The scattered light can be in-phase or out-of-phase (alternatively coherent or incoherent) with respect to the light flowing along the optical path. Moreover, the scattered light and the light flowing along the optical path can have the same color, wavelength, frequency, or energy as one another. Alternatively, the scattered light can be blue-shifted, red-shifted, or of different color, with respect to the light flowing along the optical path.

The processing and/or analysis of the scattered light can proceed in any of a suitable variety of ways. For example, the processing can comprise imaging light emanating from the optical system, using a CCD, a camera, or a one- or two-dimensional array of detectors elements that are sensitive to light in the spectral region of the scattered light. The processing could also comprise using an optical fiber to receive the scattered light, wherein the fiber is moved over the optical system, or some particular area or component thereof, to create a scanned profile. Alternatively, the processing could comprise placing a light-responsive film, such as photographic film, in the vicinity of the system to form an image of the scattered light on the film. The processing and/or analysis could also comprise using an interferometer, a spectrometer, a spectrophotometer, a photometer, etc. as a receiver of light. Moreover, the processing and/or analysis can comprise manual, automatic, or computer-based data analysis, for example to infer a characteristic from an intensity profile of the scattered light. Alternatively, the intensity profile can be viewed as a characteristic of the optical path or of the optical system. Presentation of these examples is not to be interpreted as limiting the scope of processing and/or analyzing the scattered light, rather the examples are provided as representative possibilities.

The discussion of evaluating optical systems presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
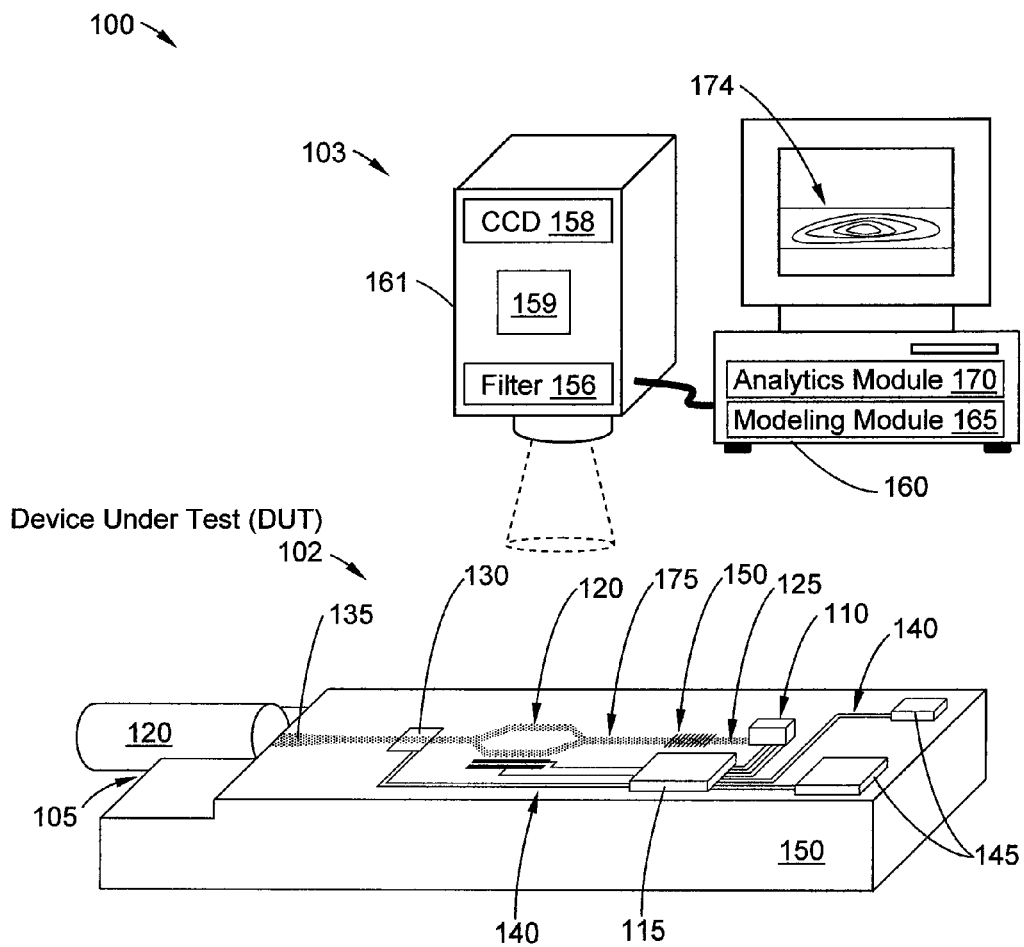
FIG. 1 illustrates an exemplary system for evaluating an optical device via detecting light that escapes from a channel of the optical device in accordance with an embodiment of the present invention.

Many aspects of the invention can be better understood with reference to the above drawings. The components in the drawings are not to scale, emphasis instead being placed upon clearly illustrating the principles of exemplary embodiments of the present invention. Moreover, the relative sizes of certain features may be exaggerated as deemed beneficial to facilitate visualization, for clarity, and/or for emphasis. In the drawings, reference numerals designate like or corresponding, but not necessarily identical, elements throughout the several views.

DETAILED DESCRIPTION OF EXEMPLARY EMBODIMENTS

Exemplary embodiments of the present invention can support evaluating an optical system, that comprises an optical channel having an inlet port and an outlet port, via observing light that exits the optical channel at a site other than the inlet port or the outlet port, for example at some location between the inlet port and the outlet port. The exiting light can result from transmitting exciting light between the inlet port and the outlet port. In various exemplary embodiments, the evaluation may benefit a wide array of applications and devices.

Figure 2:
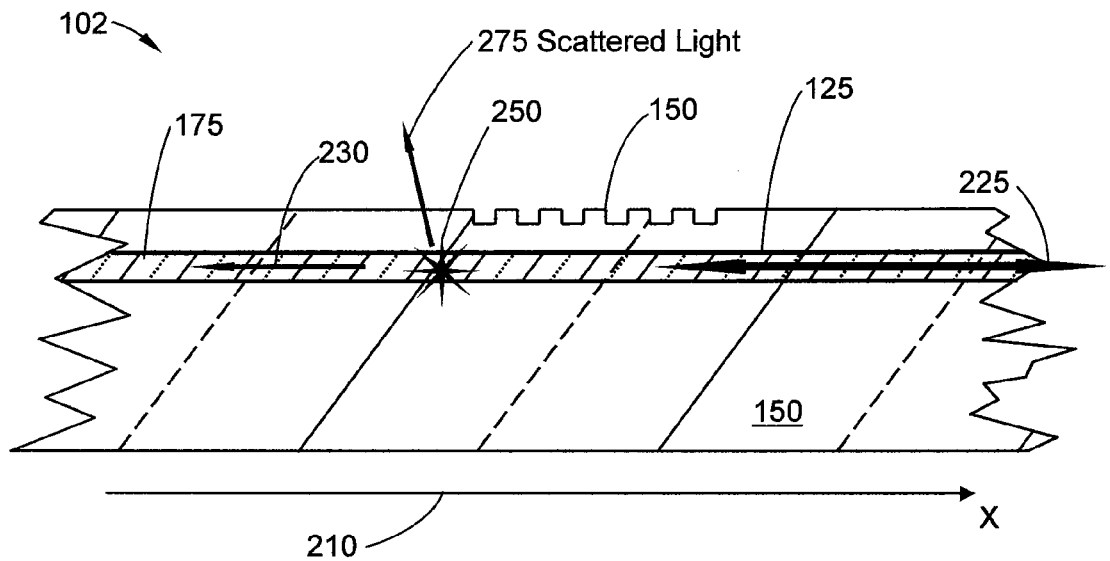
FIG. 2 illustrates a cross sectional view of an exemplary optical device that is undergoing evaluation in accordance with an embodiment of the present invention.
Figure 3:
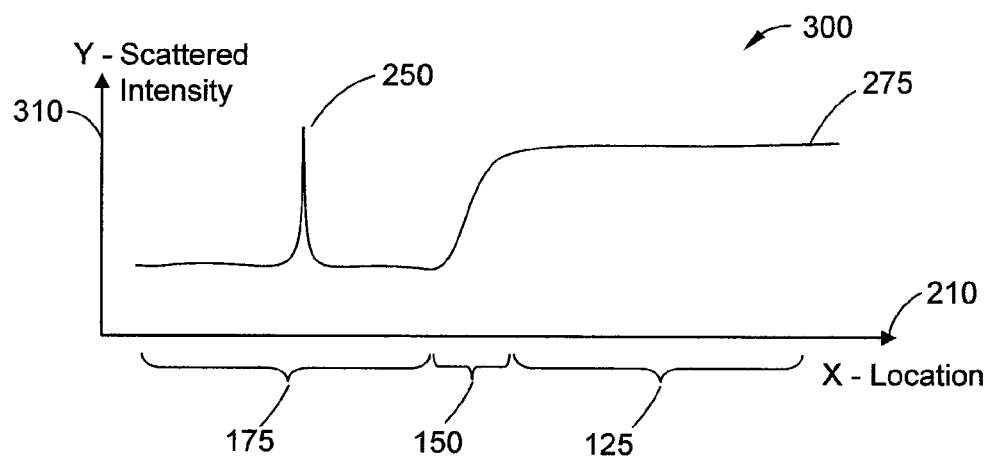
FIG. 3 illustrates an exemplary plot of light intensity in a channel of an optical device as determined via monitoring light escaping from a channel of the optical device in accordance with an embodiment of the present invention.
Figure 4:
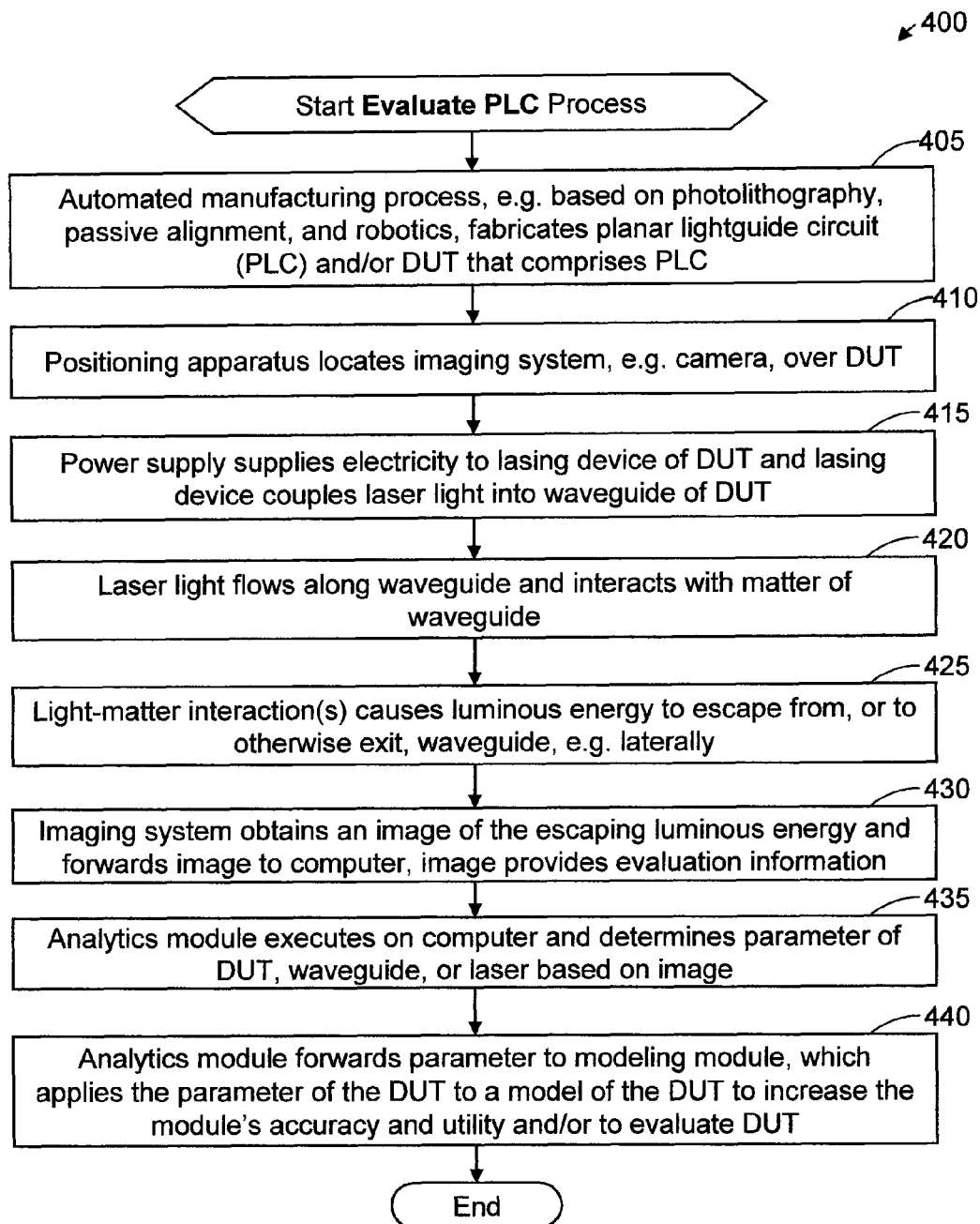
FIG. 4 illustrates a flowchart of an exemplary process for evaluating an optical device in accordance with an embodiment of the present invention.

A method and system for evaluating an optical device will now be described more fully hereinafter with reference to FIGS. 1-4, which illustrate representative embodiments of the present invention. FIG. 1 depicts a device under evaluation and a system that conducts the evaluation. FIG. 2 provides a detail view of a light-matter interaction occurring at or in the device under evaluation. FIG. 3 shows an evaluation result. FIG. 4 presents a process for evaluating an optical device.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Moving to discuss each of the drawings presented in FIGS. 1-4, in which like numerals indicate generally like elements through the several figures, an exemplary embodiment of the present invention will be described in detail.

Turning now to FIG. 1, this figure is an illustration of a system 100 for evaluating an optical device 102 via detecting light that escapes from a channel 125, 175 of the optical device 102 according to an exemplary embodiment of the present invention. The system 100 comprises an imaging system 103 mounted, oriented, or otherwise disposed over the DUT 102, which comprises (or can be) a PLC in the illustrated example. As will be discussed in further detail below, the imaging system 103 detects or monitors light emanating from a channel 125, 175 of the DUT 102.

The exemplary DUT 102 comprises a planar or slab-shaped substrate 150 with various optical and electrical features and elements attached or integrated thereto. An optical fiber 120 is seated in a v-groove 105 of the substrate 150 that supports the optical fiber 120 to maintain its position.

The term "substrate," as used herein, generally refers to a substratum, something that is spread or laid under or around something else, an element or material that serves as a foundation, an underlying layer, or a supporting material on which or into which optical and/or electrical features or components are formed or fabricated. A substrate can be a body or a base section of an integrated optical, optoelectronic, or electrical circuit on which, into which, or under which features are imprinted, imposed, deposited, attached, or otherwise integrated. Often, a substrate may be fabricated from a larger wafer and may be cut or parted therefrom as a die. For example, a wafer may yield numerous PLCs that can function as substrates.

A tapered section 135 of waveguide expands the mode of the light flowing therethrough. Thus, the taper 135 receives light flowing from the channels 125, 175 of the DUT 102 and processes the light to provide an optical format that facilitates efficient optical coupling between optical channels 125, 175 of the substrate 150 and the optical channel of the optical fiber 120. In other words, the taper 135 helps compensate for differences between optical characteristics of the substrate 150 and the optical characteristics of the optical fiber 120.

A variable optical attenuator 130 controls intensity of the light flowing into the taper 135, and thus the amount of light coupled into the optical fiber 120. Electrical circuitry 115, 140, 145 that is integrated into or attached to the substrate 150 controls the variable optical attenuator 130. Accordingly, a digital controller, logical device, or microprocessor 115, 145 of the DUT 102 operates the variable optical attenuator 130 and thus manipulates light intensity flowing therefrom.

The DUT 102 also comprises a light emitter, in this example a laser 110 that may operate at a communication wavelength such as 1550 nanometers. The laser 110 couples light into a waveguide channel 125 embedded in the substrate 150. A grating 150 provides an external lasing cavity that stabilizes the laser 110 to a specific wavelength, for example setting the laser 110 for compatibility with a wavelength coordinate of a dense wavelength division multiplexing ("DWDM") grid. Electrical circuitry 140, 115, 145 controls the laser 110, for example managing power, temperature, and wavelength locking. Such electrical circuitry 140, 115, 145 can comprise transistors or logical gates integrated into the substrate 150.

A defined wavelength or color of light flows into the waveguide channel 175 from the grating 150. A Mach-Zehnder modulator 120 modulates the laser light, encoding information thereon. Using onboard circuitry 140, 115, 145, the DUT 102 receives electrical signals carrying data and impresses that data onto the optical signal via the modulating interferometer 120. Thus, the DUT 102 can comprise a variety of optical, electro-optic, and optoelectronic devices, features, and elements, each with channels and paths that can be individually, collectively, or systemically evaluated via monitoring light that escapes from those channels and paths.

The laser 110, the variable optical attenuator 130, the electrical components 115, 145, and the modulator 120 (as well detectors, amplifiers, and other devices discussed herein) can be grown on or from, bonded to, attached to, or otherwise integrated with the substrate 150 as a PIC or a PLC, for example.

In addition to the features that FIG. 1 explicitly depicts, the DUT 102 can comprise shaped surfaces that manipulate light, for example convex, cylindrical, or concave contours of a lens or some other passive or active device. The DUT 102 can be sealed in a hermetic environment, for example in an enclosure with a window that can transmit light that the imaging system 103 detects.

In various alternative embodiments, the DUT 102 could be a packaged electronic, optical, or optoelectronic system, for example a receiver, transmitter, or transceiver module for optical networking. In an exemplary embodiment, the DUT 102 can be or can comprise a CCD, a display, a flat panel display system, a dense wavelength division multiplexing ("DWDM") device, an optical add drop multiplexing ("OADM") device, or a coarse wavelength division multiplexing ("CWDM") device.

In one exemplary embodiment, the substrate 150 may comprise a plate, block, or slab of optical material, such as glass, silica, sapphire, or silicon. In one exemplary embodiment, the substrate 150 comprises a semiconductor material, such as a silicon-based material, InGaAs, germanium, indium phosphide ("InP"), etc. The substrate 150 and various elements can be either monolithically integrated or hybrid integrated. Moreover, these elements can be grown on, embedded in, or bonded to the substrate 150. Accordingly, the DUT 102 can be a unitary structure, a monolithic system or "chip," or a collection of elements fastened together.

The substrate 150 can be doped to provide electrical, optical, and optoelectronic functionality. In various exemplary embodiments, the composition of the substrate 150 can include silicon oxynitride, diamond (such as diamond-like carbon), graphene, graphic layers, graphitic material, silicon carbide, magnesium fluoride ($MgF_2$), dielectric material, silicon, titanium dioxide ($TiO_2$), aluminum oxide ($Al_2O_3$), metal oxide, thin films, or interference filters, among other possibilities. The substrate 150 can comprise a single crystal, long-term or short-term crystalline structure, a long-term or short-term repeated pattern of atoms or molecules, or amorphous material, for example.

In one exemplary embodiment, the DUT 102 can comprise one or more patterns, features, active areas, transistors, gates, light manipulators, amplifiers, optical amplifiers, MEMS elements, optical devices, lenses, logical elements, doped features or regions, active elements, etc., any of which can undergo evaluation via monitoring light escaping therefrom.

In one exemplary embodiment, the DUT 102 and/or the substrate 150 can comprise one or more components that provide passive light manipulation, such as collimating light or guiding light. Such exemplary passive components can include diffractive elements, holographic lenses, concave lenses, convex lenses, cylindrical lenses, Fresnel lens, PLCs, prisms, circulators, isolators, lens arrays, ball lenses, micro-optic components, nano-optic elements, planar micro-lens arrays, ion-exchanged components, displays, interconnects, crystals, lenslets, lenticulars, diffusers, micro-fluidic components, or other passive components known to those skilled in the art, according to exemplary embodiments of the present invention. Any of these elements can comprise one or more optical channels or paths that can be evaluated via the imaging system 103 monitoring light escaping therefrom.

In addition to passive manipulation, the DUT 102 and/or the substrate 150 can actively manipulate light. Thus, the substrate 150 can comprise one or more VCSELs, DFB lasers, Fabry-Perot lasers, SOAs, SiOAs, silicon photonic devices, silicon-based lasers, Raman lasers, EDFAs, EDWAs, CCDs, LEDs, APDs, InGaAs detectors, optical modulators, germanium detectors, sensors, or other active components known those skilled in the art. Any of these elements can comprise one or more optical channels or paths that can be evaluated via the imaging system 103 monitoring light escaping therefrom.

In one exemplary embodiment, the DUT 102 comprises a silicon photonic device. The silicon photonic device can comprise a lasing device that comprises silicon, an SiOA, a silicon-based modulator, an attenuator comprising silicon, a silicon-based detector, a silicon-based emitter, and/or an optically-pumped silicon amplifying device, to name a few examples.

The eight documents listed immediately below disclose exemplary silicon photonic devices and technologies that exemplary embodiments the DUT 102 can comprise.

Accordingly, the imaging system 103 can evaluate the optical properties of the various optical channels, materials, or elements of the systems disclosed in the below eight documents, the entire disclosures of which are hereby incorporated herein by reference:

1) "*A Continuous-Wave Raman Silicon Laser*," by Haisheng Rong, Richard Jones, Ansheng Liu, Oded Cohen, Dani Hak, Alexander Fang, and Mario Paniccia, *Nature* 3346, Mar. 2, 2005. Available at www.nature.com/nature and at www.intel.com.

2) "*An All-Silicon Raman Laser*," by Haisheng Rong, Ansheng Liu, Richard Jones, Oded Cohen, Dani Hak, Remus Nicolaescu, Alexander Fang, and Mario Paniccia, *Nature*, Volume 433, Jan. 20, 2005. Available at www.nature.com/nature and at www.intel.com.

3) "*Silicon Shines On*," by Jerome Faist, *Nature* Volume 433, Feb. 17, 2005. Available at www.nature.com/nature and at www.intel.com.

4) "*Continuous Silicon Laser, Intel researchers create the first continuous silicon laser based on the Raman effect using standard CMOS technology*," by Sean Koehl, Victor Krutul, and Mario Paniccia, published by Intel Corporation as a white paper, 2005. Available at www.intel.com.

5) "Intel's Research in Silicon Photonics Could Bring High-speed Optical Communications to Silicon," by Mario Paniccia, Victor Krutul, and Sean Koehl, published by Intel Corporation as a white paper, February 2004. Available at www.intel.com.

6) "*Silicon Photonics*," by Mike Salib, Ling Liao, Richard Jones, Mike Morse, Ansheng Liu, Dean Samara-Rubio, Drew Alduino, and Mario Paniccia, *Intel Technology Journal*, Volume 08, Issue 02, May 10, 2004. Available at www.intel.com (http://developer.intel.com/technology/itj/index.html).

7) "*Introducing Intel's Advances in Silicon Photonics*," by Mario Paniccia, Victor Krutul, Sean Koehl, published by Intel Corporation as a white paper, February 2004. Available at www.intel.com.

8) "*Intel Unveils Silicon Photonics Breakthrough: High-Speed Silicon Modulation*," by Mario Paniccia, Victor Krutul, and Sean Koehl, *Technology@Intel Magazine*, February/March 2004. Available at www.intel.com.

Referring now to FIG. 1, the imaging system 103 comprises a camera 161 that receives light emanating from the DUT 102. The camera 161 typically incorporates a CCD 158 to capture an image of that light, specifically receiving photons and producing corresponding electrons to produce an electronic image for storage and/or computer-based processing.

An optional optical filter 156 blocks light of at least one wavelength and allows light of another wavelength to pass. Thus, the filter 156 can support detecting light of shifted wavelength or color, for example via Raman scattering or fluorescence. The filter 156, in an exemplary embodiment, rejects laser light (or some other specific band) and transmits the light that is wavelength shifted, e.g. to the red or to the blue.

The imaging system 103 can further comprise a spectrometer 159 (illustrated in an exemplary location in block diagram form and as a component of the camera 161) that separates light into constituent colors, so that spectral content can be discerned.

In one exemplary embodiment, the imaging system 103 can troubleshoot the DUT 102 or an associated PLC. A Raman imaging spectrometer can acquire an overhead image of the DUT 102 while light transmits through a channel of the DUT 102, for example a waveguide core of a PLC. The acquired image 174 can help diagnosis any problems with the DUT 102, in any of the various embodiments discussed herein, for example. A problem or flaw in the waveguide core shows up on the image 174, as one or more intense pixels on the spectrometer's CCD 158, for example. Kaiser Optical Systems of Ann Arbor, Mich. is a supplier of high sensitivity imaging cameras and spectrometers that can function as the camera 103, in an exemplary embodiment.

The spectrometer 159, which can be a spectrophotometer, creates a digital spectrum of the emitted light that can characterize the DUT 102 or some property thereof. The spectrometer 159 typically links to a computing system 160 that performs spectral analysis and that comprises a data storage device, a processor, and spectral analysis software 170.

In one exemplary embodiment, the imaging system 103 can be viewed as a light processor that receives light from the DUT 102 and analyzes that light to characterize or evaluate the DUT 102. Moreover, the imaging system 103 itself, the camera 161, and/or the spectrometer 159 can be or comprise an exemplary embodiment of a light processor.

The spectrometer 150 can comprise a spectrograph 159 or a spectrophotometer 159 based on a volume holographic transmission grating, for example. In such an embodiment, the spectrometer can produce digitally recorded spectra of the emissions from the DUT 102. Candidate suppliers of such a light processor include: (i) Process Instruments, Inc. of Salt Lake City, Utah; and (2) Kaiser Optical Systems, Inc. of Ann Arbor, Mich. Thus, the spectrometer 159 can separate the light emanating from the DUT 102 into constituent wavelengths, measure the relative intensities of those constituent wavelengths, and determine the composition or some other property of the DUT 102 (or of some element thereof) based on those measured intensities. Moreover, the spectrometer 159 can determine intensity of the light escaping from the DUT 102 as a function of frequency, energy, color, or shift in one of those parameters with respect to the light flowing through the DUT 102.

In one exemplary embodiment, the imaging system 103 can obtain an image 174 of multiple wavelengths or colors of light that emit from the DUT 102, wherein each pixel of the image contains wavelength contributions from essentially any light that is projected onto the system's CCD 158. In this embodiment, the filter 156 can be removed so that the CCD 158 is primarily responsive to the light supplied by the laser 110 (or whatever wavelength of light is flowing in the channels 125, 175). Moreover, wavelength separation may eliminated, for example via removing or disabling the spectrometer 159. Accordingly, the computer 160 can display a two-dimensional intensity profile 174 of the light emanating from the DUT 102.

Moving, sweeping, or scanning the camera 161 in a plane parallel to a flat surface of the DUT 102 provides an intensity profile 174 along or across that flat surface. Moving the camera 161 to and from the DUT 102 (perpendicular to the plane) generates a depth-resolved image profile. As an alternative to physical motion of the entire camera 161, the camera's optics can be adjusted to place the focal point of the camera 161 at various depths within the DUT 102. Thus, the imaging system 103 can probe inside the DUT 102 to record light escaping from various points within a cross section of the laser 110, the taper 135, the grating 150, the modulator 120, the optical fiber 120, etc. Moreover, the imaging system 103 can record an intensity profile of emissions originating at various cross section locations of waveguides 125, 175 embedded within the substrate 150. Such emissions can propagate through a section of the substrate 150 prior to capture by the camera.

Alternatively, in another exemplary embodiment, the filter 156 can block one or more colors emitting from the DUT 102, such as the color of the light that the laser 110 emits. In this embodiment, each CCD pixel can receive multiple colors of light that are shifted from the specific color that the filter 156 attenuates. Removing the spectrometer 159 may facilitate a broad spectral response, for example.

In a yet another exemplary embodiment, the spectrometer 159 and the filter 156 can be active so the CCD 158 records a spectrum of color or wavelengths. That is, the CCD 158 can determine the intensity of light as a function of color or wavelength (or frequency) emanating from one or more specific spatial regions of the DUT 102.

In still another exemplary embodiment, the imaging system 103 projects a probing beam into the DUT 102 to help gather information from the DUT 102. For example, the imaging system 103 can focus laser light to a particular inspection site in or on the DUT 102. The focused laser light can have a different wavelength than the wavelength of the laser 110. The light from the laser 110 and the probe light can function in a collaborative matter to induce two-photon interactions with the DUT 102, thereby providing useful information about the DUT 102, such as a physical, chemical, or operational parameter thereof.

The computer system 160 receives images and/or spectra from the camera 155 and processes or analyzes the data in those images or spectra. The computer system 160 comprises a modeling module 165 and an analytics module 170. The analytics module 170 can send evaluation information about the DUT 102 to the modeling module 165, as discussed below, to enhance the modeling module's accuracy and effectiveness.

The modeling module 165 provides a software-based model of the DUT 102 or a portion thereof, such as the laser 110, the modulator 120, the variable optical attenuator 130, the taper 135, the grating 150, a waveguide segment 125, 175, etc. The modeling module 165 can comprise a commercially available software package such as one or more of the software packages sold by RSOFT Design Group Inc. of Ossining, N.Y. More specifically, the modeling module 165 can comprise one or more of the simulation tools that RSOFT markets under the trade names "MetroWAND;" "Artifex;" "OptSim;" "ModeSys;" "BeamPROP;" "FullWAVE;" "B and SOLVE;" "GratingMOD;" "DiffractMOD;" "MOST;" "FemSIM;" and/or "LaserMOD.," for example. Using these capabilities, the modeling module 165 can simulate a passive component, an active component, a link, a network, or the entire DUT 102, for example. In one exemplary embodiment, the modeling module 165 provides an integrated model or simulation of optical, optoelectronic, and electrical (e.g. transistor logic) features or operation of the DUT 102.

In one exemplary embodiment, the modeling module 165 simulates a filter, such as a stack of thin films that comprises a thin film interference filter. To support such simulation, the modeling module 165 can comprise one or more of the software products of Software Spectra Inc, the Thin Film Center, or another supplier of analytical tools for optical coatings. Such software can assist a designer in specifying various thin film parameters of the DUT 102 to achieve a desired optical effect. Yet another useful coating design, analysis, and simulation tool is the software product known under the trade name FILMSTAR and available from FTG Software Associates of Princeton, N.J.

The analytics module 170, as will be discussed in further detail below, can determine or identify optical or physical parameters from the image information that the camera 155 provides. So identified, the analytics module 170 sends the parameter or parameters to the modeling module 165. The modeling module 165 uses the identified parameter(s) to enhance or improve the modeling or simulation of the DUT 102 or some aspect thereof.

For example, the camera 102 could obtain Raman spectra of a waveguide 125, 175 or of the laser 110. The analytics module 170 can determine a composition of the waveguide, the waveguide's crystal structure or strain, a temperature of the waveguide, or an intensity of laser light in the waveguide using principle components analysis ("PCA"), partial least square ("PLS"), Kalman filtering, or some known spectral analysis tool. Commercial software to determine such parameters based on spectral processing include the software packages marketed by Advanced Chemical Development, Inc. of Toronto, Ontario, Canada under the trade name "ACD/UV-IR Manager" and one or more programs or tools of the suite of software products marketed by Thermo Fisher Scientific, Inc. of Waltham, Mass. under the trade name "GRAMS." Accordingly, the analytics module 170 can comprise one of these commercial programs or some similar software, for example.

The analytics module 170 feeds analytical results to the modeling module 165 so the simulation or model of the DUT 102 is more precise or reflects a specific DUT 102, as opposed to a generic device. For example, the modeling module 165 can compare performance variations between individual DUT units 102 in a manufacturing run. Moreover, the modeling module 165 can process analytical results or information from the analytics module 170 to determine device-to-device variations due to manufacturing tolerances, supplier variations, operating conditions, or other effects.

An operational example of the system 100 follows. An engineer uses a commercially available design, modeling, or simulation tool, in the form of the modeling module 165 to simulate the DUT 102. The software model is at least partially inaccurate as precise optical and performance parameters of the DUT 102 are estimates that deviate from actual values. Operating the DUT 102 produces light flowing through the components, elements, and/or features of the DUT 102. The flowing light interacts with matter of the DUT 102, and the interaction causes some of that light (or luminous energy thereof) to escape from the DUT 102. The imaging system 103 records spectra of the escaping light and feeds the spectra, in electronic form, to the computer system 160. The analytics module 170 applies commercially available software to determine composition, and thus refractive index, of various portions of the DUT 102 based on analysis of the recorded spectra. The analytics module 170 feeds those analytical results to the modeling module 165. The modeling module 165 applies the analytical results, in the form of refractive index, composition, or other parameters to the digital (software) model. With more accurate modeling parameters, the model better simulates the DUT 102. The engineer applies the enhanced simulation to troubleshoot the DUT 102, to investigate a production glitch, or to refine the DUT's design, for example.

Turning now to FIG. 2, this figure is a cross sectional view of an optical device 102 that is undergoing evaluation according to an exemplary embodiment of the present invention. In an exemplary embodiment, the illustrated device 102 of FIG. 2 can be the DUT 102 of FIG. 1, and will be discussed as such.

The grating 150 comprises a pattern of corrugations, grooves, or surface relief marks adjacent the optical path 175, 125. The optical path 175, 125 comprises a section of waveguide 125 that provides a lasing cavity for the laser 110. Light 125 resonates back-and-forth between the grating 150 and the laser 110, or a mirror associated therewith. A portion of that resonant light 225 transmits past the grating 150 and through the adjoining section of waveguide 175. Accordingly, the light 225 flowing in the waveguide section 125 is more intense than the light 230 flowing in the waveguide section 175.

Light 275 exits, leaves, escapes from, or is scattered out of the optical path 175, 125. The imaging system 103 monitors and captures or records that escaping or scattered light 275. The scattered light 275 follows a trajectory that is oriented at a non-zero angle with respect to the x-axis 210 of the optical path 175, 125. Thus, the scattered light 275 diverts from the optical path 125, 175, or an x-axis 210 thereof, for reception by the imaging system 103.

For visualization purposes, FIG. 2 illustrates the x-axis 210 in a position that is displaced from the optical path 125, 175. Those skilled in the art having the benefit of this disclosure will appreciate that the x-axis 210 could be more accurately represented as being collinear with or disposed within the optical path 125, 175, but that such a representation would clutter the illustration. That is, the displaced x-axis serves to promote comprehension of FIG. 2.

The light 275 escapes as a result of one or more light-matter interactions 250 that occur between the physical material of the optical path 125, 175 and the light 225, 230 flowing in the optical path 125, 175. The light-matter interactions 250 can comprise elastic or inelastic scattering, fluorescence, Raman scattering, Rayleigh scattering, etc. In one exemplary embodiment, the scattered light 275 results from the light 225, 230 encountering microscopic structures, flaws, defects, material interfaces, and/or other features in, at, or adjacent to the optical path 125, 175. As discussed above, the scattered light 275 can have a color or a wavelength that is essentially identical to the light 125, 175, or alternatively that is shifted towards the red or towards the blue end of the spectrum. For example, green laser light might produce red scattered light, green scattered light, blue scattered light, or infrared scattered light, depending on the type of light-matter interaction associated with the scattering event 250.

The camera 161 captures the scattered light 275 (or some portion thereof) to facilitate an evaluation of the DUT 102. The evaluation can comprise determining a characteristic of the light 225, the light 230, the section 175 of optical path, the section 125 of optical path, the grating 150, the resonant optical cavity, the laser 110, or the substrate 150, for example. Moreover, the evaluation can comprise determining composition, obtaining an intensity profile, analyzing power, identifying flaws, assessing structure, monitoring temperature, verifying function of the electrical system 140, 115, 145, or testing for some other physical, chemical, or optical property.

Turning now to FIG. 3, this figure is a plot 300 of light intensity in a channel 125, 175 of an optical device 102 as determined via monitoring light 275 escaping from a channel 125, 175 of the optical device 102 according to an exemplary embodiment of the present invention. In an exemplary embodiment, the plot 300 can describe a representative spatial pattern of light that the imaging system 103 acquires from above the DUT 102.

The plot 300 presents intensity of scattered light 275 on the y-axis 310 and the physical location from which that scattered light 275 originated along the x-axis 210. In other words, the plot 300 describes the intensity of the light 275 emanating from the optical path 125, 175 as a function of location along that optical path 125, 175.

In the resonant section 125 of the optical path 125, the scattered light 275 is relatively intense. As a result of the resonance, the light 225 flowing along that path section 125 is strong or intense and produces a high level of scattered light 275. Accordingly, the level of the scattered signal 275 provides an indication not only of the scattering intensity, but also of the intensity of the resonant light 225. Thus, detecting and analyzing the scattered light 275 can be viewed as probing the laser 110, the grating 150, or the optical channel 125 from a standoff location.

The level of scattered signal 275 tapers to a lower level through the grating 150, with the simulated taper profile being representative or illustrative rather than based on precise empirical results. An actual measured profile can provide useful information about the grating 150 and/or the grating's relationship to or interaction with the waveguide 125, 175. Examples of information that can be derived from the intensity profile 300 can comprise: the depth of the grating's grooves; the distances between the grating's grooves and the waveguide 175, 125; the distances between respective ones of the grating's grooves; uniformity of groove depth; refractive indices (or index profiles) of the substrate 150, the waveguide 125, 175, or the medium surrounding the grating 150; the extent of the evanescent field of the light 225, 230; or the peak wavelength reflectivity of the grating 150, to name a few possibilities.

In the region 175 of the scattered signal plot 275 that corresponds to the optical path section 175, intensity is relatively low, resulting from the relatively low intensity of the light 230 flowing therein. The signal intensity differential between those two optical path sections 125, 175 can provide an indication of the relative intensities of the lights 225, 230 flowing therein.

The peak 250 can arise from or be indicative of a material defect or a flaw in the material structure of the optical path 175, for example. A high level of scattered light 250 emanating from a particular point 250 can result from a fracture or material concentration at that point 250 that is small, for example nano-sized or sub-microscopic. The peak 250 might also be indicative of quantum or artificially-induced confinement of light or electrons, or one or more quantum dots, for example.

While FIG. 3 illustrates intensity information collected along the waveguide path 125, 175, similar profiles can be obtained in a perpendicular dimension, that is across a depth of the substrate 150 or some feature or component attached thereto. As discussed above with reference to FIG. 1, such cross sectional or depth profiles can reveal intensity profiles inside or across an optical path associated with the DUT 102 and can be generated via focusing the camera 161 to various depths within the optical path. Profiling intensity of escaping or scattered light 275 across a waveguide 125, 175 can provide an intensity profile that describes the shape of the modal pattern with the waveguide 125, 175 or that describes the geometry and physical parameters of the waveguide 125, 175.

An exemplary process 400 for evaluating the DUT 102 will be discussed below with reference to FIG. 4. In certain embodiments, that process, or other processes disclosed herein, may comprise or involve computer programs, computer-implemented steps, or software.

Accordingly, some exemplary embodiments the present invention can include one or more computer programs embodying certain functions described herein and illustrated in the examples, diagrams, and appended flow charts. However, it should be apparent that there could be many different ways of implementing aspects of the present invention in computer programming, and the invention should not be construed as limited to any one set of computer program instructions. Further, a skilled programmer would be able to write such computer programs without difficulty based on the exemplary functional block diagrams, flow charts, and associated description in the application text, for example.

Therefore, disclosure of a particular set of program code instructions is not considered necessary for an adequate understanding of how to make and use the present invention. The inventive functionality of any programming aspects of the present invention will be explained in more detail in the following description in conjunction with the remaining figures illustrating the functions and program flow and processes.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Referring now to FIG. 4, this figure is flowchart of a process 400 for evaluating an optical device 102 according to an exemplary embodiment of the present invention. The following discussion of Process 400, which is entitled Evaluate PLC, will refer often to the illustrations of FIGS. 1, 2, and 3 to provide one or more examples. However, various embodiments of Process 400 can function with or accommodate a wide range of devices, systems, and hardware and can function in a wide range of applications and situations. Moreover, the methodology of Process 400 supports evaluating essentially any of the exemplary apparatuses or DUT components and embodiments discussed herein.

At Step 405 of Process 400, an automated (or alternatively a manual or semiautomatic) manufacturing process produces a PLC. The manufacturing process can comprise ion exchange, silicon-on-insulator, photolithography, thin-film deposition, epitaxy, chemical vapor deposition epitaxy, molecular beam epitaxy, chemical beam epitaxy, hydride vapour phase epitaxy, or providing optical and/or optoelectronic features on a silicon substrate along with electronic features, to name a few possibilities.

In an exemplary embodiment, the produced PLC is an embodiment of the DUT 102. Alternatively, the DUT 102 can comprise the PLC or vice versa. In an exemplary embodiment, Step 405, or a facsimile thereof, results in a device that has an optical path for transmitting light either via a waveguide or via some other light transport capability, including propagating light in an unbounded or free state. The produced device can comprise a MEMS device, a laser, a train or series of lenses, a system of mirrors, a filter, or one of the other elements discussed above in the context of an evaluation thereof, for example. In other words, a DUT 102 exemplified by the DUT 102 that FIG. 1 illustrates results from Step 405. Accordingly, the product of Step 405 will be referred to as the DUT 102.

At Step 410, a positioning apparatus locates the imaging system 103 (or more specifically the camera 161 of the imaging system 103) over (or under) the DUT 102. The positioning system can have three degrees of freedom to facilitate inspecting various portions of the DUT 102. One degree of freedom can be translation along the x-axis 210, while the other two degrees of freedom can be translation normal (perpendicular) to that x-axis 210.

For example, a robotic arm or a computer-controlled gantry orients the camera 161 with respect to a flat or planar surface of the substrate 150. That surface of orientation can be the top or the bottom of the substrate 150, for example. In one exemplary embodiment, the substrate 150 has a registration mark, such as an x-shaped geometrical pattern attached thereto to facilitate camera orientation.

Orientation of the camera 161 can comprise open-loop, closed-loop, or feedback control for example. Orienting or positioning the camera 161 with respect to a planar surface of the DUT 102 can further comprise moving the DUT 102 while maintaining the camera 161 in a fixed position. For example, a conveyor, or some other material moving system, for example at a test station associated with an assembly line, can move each fabricated DUT 102 into the field of view of the camera 161 so that the camera 161 can capture light emanating from the DUT 102.

Moreover, orientating the camera 161 with respect to the DUT 102 can comprise positioning a flat surface or a reference surface of the DUT 102 with respect to the camera 161 so that an optical axis (such as an imaging axis) of the camera 161 intersects a major surface (such as the flat or reference surface) of the substrate 150. Such orienting can further comprise establishing an imaging plane within a volume occupied by the DUT 102 so that the camera 161 preferentially collects light from a plane or a volume that is inside some component of the DUT 102. Accordingly, the imaging system 102 can acquire profiles of light emanating from a buried waveguide or from some other embedded component or feature, for example without needing physical contact or access thereto. Thus, the imaging system 102 can probe inside the DUT 102 without necessarily contacting the DUT 102.

At Step 415, a power supply provides electricity to the laser 110 of the DUT 102, resulting in the laser 110 coupling light 225 into the waveguide section 125 (or to some other optical path thereof). The power supply can be onboard the DUT 102 or alternatively part of an evaluation station. In one exemplary embodiment, the light 225, 230 propagating through the DUT 102 carries digitally encoded information.

Moreover, operating the DUT 102 under typical application conditions can produce the light 225, 230. In one exemplary embodiment, the light 225, 230 carries information that is transmitted to (or from) an external network. For example, the DUT 102 can be deployed in a live network application, and the camera 103 can receive light emanating (and/or scattered) from the DUT 102 as the DUT 102 operates. Thus, network traffic can excite a light-matter interaction 250 that produces the scattered light 275 (e.g. as rays of light) that the camera 161 detects or records.

For example, the imaging system 103 can monitor light emitted from a DUT 102 that is permanently installed in a telecommunications network or a LAN network. Accordingly, the light 225, 230 can convey a payload of analog or digital information over an optical network, for example. In one exemplary embodiment, Process 400 produces an indication or measurement of the line width, spectral composition, or power of the light 225, 230 as that light conveys the payload. For example, the spectrometer 159 or some other optical instrument can analyze Rayleigh scattered laser light to evaluate the laser's spectral purity or coherency.

At Step 420, the laser light 225, 230 flows along the waveguide 125, 175 and interacts with matter or material of the waveguide 125, 175. That matter or material can be inherent to the composition of the waveguide 125, 175. Alternatively, the matter or material with which the light 225, 230 interacts can be applied in connection with the evaluation of the DUT 102. Such material might be a waveguide dopant, a fluid, or a material applied to the surface of the substrate 150. For example, evaluating the DUT 102 can comprise temporarily coating the DUT 102 with a fluorescent material such as fluorescein, a film that comprises artificially confined electrons, a slurry or fluid that comprises quantum dots, silver or gold nanoparticles, a material that induces SERS, or a composition that enhances scattering, fluorescence, or a Raman effect. Accordingly, in various exemplary embodiments, the evaluation of the DUT 102 can comprise either a nondestructive test or a destructive test.

At Step 425, the light-matter interaction 250 causes photonic energy to escape from the waveguide 125, 175 (or some other optical path of the DUT 102). The escaping energy can comprise scattered light 275, one or more photons, or electromagnetic energy.

In one exemplary embodiment, the scattered light 275 is light released from a laser cavity, for example the waveguide 125, a section of a gain medium, or an active electro-optic material, for example. Analyzing such released light can provide a means to monitor laser performance, for example. Further, the analysis can proceed with the laser 110 deployed in a network, for example.

The scattered light 275 can be viewed as being some of the laser light 225, 230 even though the scattered light 275 may have a distinct wavelength of color. For example, the scattering event 250 can comprise a photon of the laser light 225, 230 transferring part of its energy to a chemical bond, wherein the remaining part of that energy exits the waveguide 125, 175 as one or more distinct photons 275.

As discussed above, the scattered light 275 can comprise light or photonic energy that results from Raman scattering, Rayleigh scattering, Mie scattering, fluorescence, quantum confinement, a two-photon interaction, a nonlinear optical response, luminescence, phosphorescence, quantum dots, etc.

At Step 430, the imaging system 103 acquires an image 174 of luminous energy or scattered light 275 escaping from the DUT 102 and/or an image 174 of the DUT 102 with the light 275 emanating therefrom. As discussed above, the imaging system 103 can comprise the camera 161 to acquire images, spectra, and/or intensity patterns or profiles 174, 300 of the light 275 and/or the DUT 102. The camera 158 sends the acquired image (or intensity pattern) 174, 300 in electronic format to the computer 160.

As an alternative to a CCD-based camera 161, the imaging system 102 can comprise a fiber optic receptor that collects, accepts, and transports the scattered light 275. For example, the imaging system 102 can comprise an optical fiber with a tapered tip at its distal end and a detector at its proximal end. The sidewalls of the tapered tip can be coated with gold or some other reflective material. The tapered and metallized tip can comprise a light receptor for a near-field microscope. A positioning system can scan the tip over the DUT 102 to detect patterns 174, 300 of light emissions 275. In one exemplary embodiment, a surface of the DUT 102 (for example a flat surface of the substrate 150) can be positioned in the near field of the fiber optic tip, and the fiber optic tip can be moved or swept back and forth over the substrate 150 to pattern the scattered light 275 emanating therefrom.

At Step 435, the analytics module 170 processes acquired images, spectra, or intensity patterns 174, 300 from the camera 161. As discussed above, the analytics module 170 processes this information to determine some parameter, characteristic, quality, or value of the DUT 102. For example, the analytics module 170 can derive from that information a refractive index, an intensity, a light speed, a contrast, a temperature, a concentration of a dopant, a level of fracturing, etc. The result is typically quantitative, but can alternatively be qualitative, for example. The result can also describe or characterize an optical communication signal flowing through the DUT 102, for example characterizing spectral position, intensity, color, etc. In one exemplary embodiment, such a communication comes from a remote network location and triggers emission events 250 that result in scattered light 275.

At Step 440, the analytics module 170 transfers the result, which may be a parameter as discussed above, to the modeling module 165. The modeling module 165 applies the parameter to a model of the DUT 102 thereby improving the model and, for example, increasing the module's accuracy or utility.

Process 445 ends following Step 440. An engineer, a technician, or production personnel can use the model 165 to evaluate the DUT 102 for any number of purposes, including quality control, verification, troubleshooting, refining a design, etc.

From the foregoing, it will be appreciated that the present invention overcomes the limitations of the prior art. From the description of the exemplary embodiments, equivalents of the elements shown herein will suggest themselves to those skilled in the art, and ways of constructing other embodiments of the present invention will suggest themselves to practitioners of the art. Therefore, the scope of the present invention is to be limited only by the claims that follow.

What is claimed is:

1. A method for characterizing matter disposed in a core of an optical waveguide, comprising the steps of:
    coupling light from a laser into the core of the optical waveguide, the coupled light guided lengthwise along the core and through the matter;
    projecting a probing beam at the matter, the probing beam and the guided light inducing two-photon interactions that cause photons to transmit laterally out of the waveguide; and
    characterizing a property of the matter by processing the photons transmitted laterally out of the waveguide.

2. The method of claim 1, wherein the coupled light transmits optically encoded information lengthwise along the waveguide.

3. The method of claim 1, wherein the probing beam comprises light from a second laser focused on the matter.

4. The method of claim 1, wherein the optical waveguide comprises a device under test (DUT), and wherein characterizing the matter comprises determining an operational parameter of the DUT.

5. The method of claim 1, wherein characterizing the matter comprises determining a chemical parameter of the matter.

6. The method of claim 1, wherein the probing beam and the light from the laser have different wavelengths.

7. A method, for characterizing matter disposed in an optical path that extends lengthwise and that comprises a core and a cladding forming an optical waveguide, the method comprising the steps of:
    illuminating the matter with first laser light and second laser light in response to focusing the second laser light onto the matter while the cladding guides the first laser light to flow lengthwise along the optical path;
    scattering photons out of the optical path in response to the first laser light and the second laser light collectively inducing two-photon interactions in the matter; and
    analyzing the scattered photons to determine a characteristic of a property of the matter.

8. The method of claim 7, wherein the first laser light comprises optically encoded information.

9. The method of claim 7, wherein the second laser light comprises a probing beam.

10. The method of claim 7, wherein the optical waveguide comprises a device under test (DUT), and wherein determining a characteristic of the matter comprises determining an operational parameter.

11. The method of claim 7, wherein the matter is embedded in the core.

12. The method of claim 7, wherein determining a characteristic of the matter comprises determining a chemical parameter of the matter.

13. The method of claim 7, wherein the first laser light and the second laser light have different wavelengths.

14. A method, for characterizing matter of an optical path that comprises a core and a cladding running along a substrate, the method comprising the steps of:
    transmitting luminous energy along the optical path, wherein the transmitting luminous energy comprises laser light guided by the cladding to interact with the matter;
    scattering, by two-photon interactions with the matter, a portion of the transmitting luminous energy out of the optical path, wherein the guided laser light and another laser light focused to the matter induce the two-photon interactions;
    analyzing the scattered portion of the luminous energy; and
    characterizing a property of the matter based on said analysis.

15. The method of claim 14, wherein the laser light comprises optical communication signals.

16. The method of claim 14, wherein the guided laser light and the another laser light differ in wavelength, and wherein the another laser light comprises a probing beam.

17. The method of claim 14, wherein a device under test (DUT) comprises the core, the cladding, and the substrate.

18. The method of claim 14, wherein the matter is embedded in the core.

19. The method of claim 14, wherein characterizing the matter based on said analysis comprises determining a chemical parameter of the matter.

20. The method of claim 14, wherein characterizing the matter comprises determining an operational parameter.

* * * * *